United States Patent [19]

Alexander et al.

[11] Patent Number: 5,182,793
[45] Date of Patent: Jan. 26, 1993

[54] COMPUTER-AIDED DECISION MAKING WITH A SYMBOLIC SPREADSHEET

[75] Inventors: Rhonda L. Alexander; Michael E. Irrgang; John A. Kirchner; Marsha H. Ellis; Charles Warren Young, all of Austin, Tex.

[73] Assignee: Texas Instruments Incorporated, Dallas, Tex.

[21] Appl. No.: 896,731

[22] Filed: Jun. 9, 1992

Related U.S. Application Data

[63] Continuation of Ser. No. 821,234, Jan. 9, 1992, abandoned, which is a continuation of Ser. No. 373,420, Jun. 30, 1989, abandoned.

[51] Int. Cl.⁵ .............................................. G06F 15/18
[52] U.S. Cl. ......................................... 395/13; 395/51
[58] Field of Search ................... 395/13, 10; 364/419, 364/51, 54

[56] References Cited

U.S. PATENT DOCUMENTS 4,935,877  6/1990  Koza .................................. 364/513

OTHER PUBLICATIONS

On Using Genetic Algorithms to Search Program Spaces; Proc. of 2nd Inter. Conf. of Genetic Algorithms; Kenneth De Jong; Jul. 28-31, 1987 pp. 210-216.
Towards the Evolution of Symbols; Dolan & Dyer; Proceedings of the Second Inter. Conf. on Genetic Algorithms (2nd ICGA); 1987; pp. 123-131.

Primary Examiner—Allen R. MacDonald
Attorney, Agent, or Firm—Pehr Jansson; Richard Donaldson

[57] ABSTRACT

An apparatus and method for assisting persons in making decisions, using a computer programmed with artificial intelligence techniques. Real world objects and events pertaining to a particular domain are represented in a knowledge base. Best choices for solving problems are made according to the application of rules, which may be applied absolutely, comparatively, by weight, or ordered, according to methods selected by the user. The invention also permits the user to select from among various decision making strategies and permits the user to observe the effects of choices in hypothetical scenarios.

14 Claims, 6 Drawing Sheets

COMPUTER-AIDED DECISION MAKING WITH A SYMBOLIC SPREADSHEET

This application is a continuation of application Ser. No. 07/821,234, filed Jan. 9, 1992, now abandoned which is a continuation of application Ser. No. 07/373,420, filed Jun. 30, 1989 now abandoned.

TECHNICAL FIELD OF THE INVENTION

This invention relates in general to computer processing, and in particular to an apparatus and method, using artificial intelligence programming techniques, for assisting human users in decision making.

BACKGROUND OF THE INVENTION

Although there is no consensus on a definition of "artificial intelligence", it is sometimes generally defined as a computer programming style in which programs operate on data according to rules to solve problems. Artificial intelligence involves the use of symbolic, as opposed to numeric, representations of data. Using computer processing to relate these symbolic representations is referred to as "symbolic processing", and permits computers to represent real world objects in the form of symbols and to then develop associations between those symbols.

A feature common to artificial intelligence programs is that they all involve knowledge, and must represent knowledge in a manner that can be used by a computer. Specific applications of artificial intelligence, including those using symbolic processing, are associated with knowledge bases. A knowledge base for a particular application includes facts about the application and rules for applying those facts, i.e., declarative and procedural knowledge relevant to the domain. The "facts" of a knowledge base may include objects, events, and relationships.

To develop useful knowledge bases, the computer industry has recognized a need to combine efforts of both software engineers and experts in the particular domain. Generally, the software engineer develops the expert system, and the domain expert provides information for the knowledge base. However, even this approach to creating knowledge bases ignores the expertise of a user, who may have his or her own skills to add to the decision making process. Thus, there is a need for a knowledge-based system that permits the skills of the user to contribute to the knowledge base.

One application of artificial intelligence is decision support for human users, especially in the form of modeling a particular real world or hypothetical operation. The operation's domain includes all objects, events, and relationships that affect behavior within the operation. Yet, many existing systems are relatively inflexible, and rely on rule-based inference engines. These systems do not compare favorably to the ability of human intelligence to make decisions on what rules apply and how to apply them. There is a need for improved methods for applying rules.

SUMMARY OF THE INVENTION

One aspect of the invention is an apparatus for aiding human users in making decisions relative to events in a particular domain of operations. The invention may be embodied in a computer system, which has a stored knowledge base, and in which the user interacts with a decision processor subsystem. Features of the apparatus include assisting a user in choosing among alternative choices relevant to the domain. The apparatus permits the user to select from a number of types of rules and other data to develop a choice method. The apparatus also permits the user to develop a strategy that includes a set of parameter values and methods designed for a particular set of choices.

The invention is implemented with programming that uses artificial intelligence techniques, including object oriented programming. For this reason, a decision processor subsystem may be sufficiently generalized such that it has modules that may be used in a number of different computer systems. Thus, an aspect of the invention is a processor apparatus that is programmed to assist the user in choosing among alternative actions.

Another aspect of the invention is a method of programming a computer to assist a user in selecting among possible alternatives. Specific features of the programming include representations of various types of data relevant to the selection process and various functions to implement the rules. The programming provides a number of different rules, and permits rules to be applied in varying ways. The programming also permits a multiplicity of methods for applying rules and enables the user to choose a desired method.

Another aspect of the invention is a method of using a computer to select a best choice among alternatives in a particular domain. Features of the method include applying different rules, applying rules in different ways, selecting among a multiplicity of methods to make a choice, and adopting strategies for decision making. A further feature of the invention permits decisions to be made in the context of hypothetical scenarios.

A technical advantage of the invention is that computer-aided decision making is accomplished in a manner that more nearly approximates human decision making. Rules may be applied non-absolutely and comparatively. A further advantage of the invention is that it allows a person to combine his or her expertise interactively with a computer system that has artificial intelligence capabilities. A still further advantage of the invention is that it combines the ability of a computer to determine the effects of events with its ability to make choices relevant to those events.

BRIEF DESCRIPTION OF THE DRAWINGS

The novel features believed characteristic of the invention are set forth in the appended claims. The invention itself, however, is best understood by reference to the following description of illustrative embodiments, read in conjunction with the accompanying drawings.

DETAILED DESCRIPTION OF THE INVENTION

Figure 1:
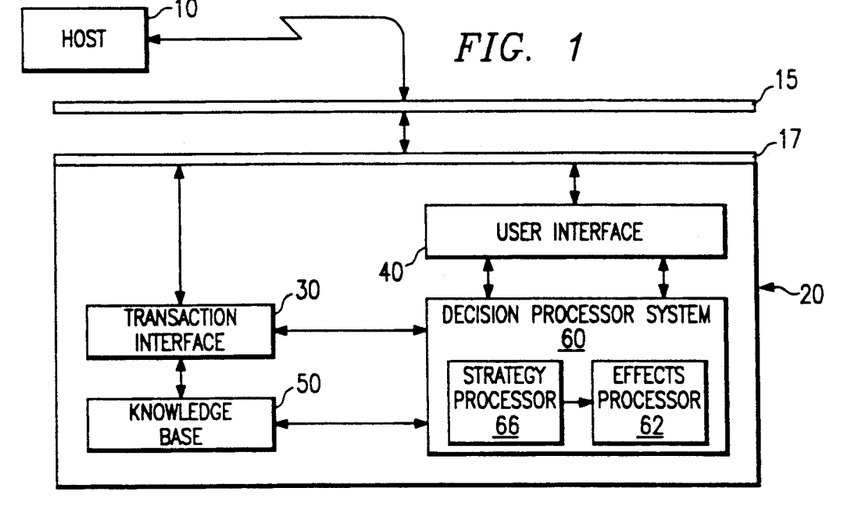
FIG. 1 is a block diagram of a computer system in accordance with the invention.

FIG. 1 represents an apparatus constructed in accordance with the present invention. In one embodiment, the invention is part of a computer network, which includes a host computer 10 and a number of stations, each in communication with host 10 by means of a network communication system 15.

An example of an application of the apparatus is a computer network for monitoring an airline flight operation, in which the domain of the operation includes all events affecting flight schedules. As will be explained below, the system provides real time support for enabling a user to comprehend the scope of a problem, observe the details of problem side effects, generate multiple possibilities for improving the situation, and evaluate alternatives for improvement. The use of this specific application is exemplary, and the apparatus and method of this invention could be used for any number of other applications in many diverse areas.

A typical station is identified with the reference numeral 20. Used in a network, each station 20 includes a terminal emulator to enable it to interact with host 10. However, it is not necessary to the invention that such a network be used, and the station may be a stand-alone processing unit.

Whether used as a terminal in a network or as a stand alone processing unit, station 20 has a number of components, including a transaction interface 30, a user interface 40, a knowledge base 50, and a decision processor system 60. These components deliver and receive information to and from each other by means of a bus 17 and other communication means. In addition, station 20 has other components (not shown) typical of a data processing terminal or stand-alone unit commonly in use. For example, memory other than that used for knowledge base 50 stores data and programming, and a timer (not shown) provides timing functions.

Transaction interface 30 permits data used by station 20 to be kept current with events that occur in the domain of the operation. Thus, transaction interface 30 is in communication with host 10 as well as with knowledge base 50. Of course, if station 20 is a stand-alone processing unit, transaction interface 30 will be in communication with some other input device and may be combined with user interface 40. Transaction interface 30 is also in communication with decision processor system 60, so that information based on decisions made using the invention can be channeled from station 20 to another station or to an output device. The hardware associated with transaction interface 30 may be any one of a number of well-known input/output and other peripheral devices designed for the functions herein described.

User interface 40 provides access for a user to the functions of the invention. User interface 40 allows input through a keyboard or other input device, and displays for permitting the user to interact with the invention. User interface 40 is also in communication with decision processor system 60. The hardware associated with user interface 40 may be any number of well-known input/output and other peripheral devices.

Knowledge base 50 contains the data necessary to perform the different functions of the system. The hardware associated with knowledge base 50 may be any memory device for electronically storing information, such as a digital storage device. Knowledge base 50 is conceptually similar to a data base of a standard data processing system, except that it contains a number of artificial intelligence structures to enable decision making. More specifically, knowledge base 50 is arranged as a semantic network of frames. In general, a frame is a knowledge representation structure that represents "objects", i.e, physical items, facts, and events, in the real world as groups of attributes. A frame contains slots, each of which can have a value. As explained below, these values can include programs to be executed. In a system of frames, frames may inherit values from other frames.

The frames within knowledge base 50 may include reasoning programming, which is more accurately described as "application behavior code." This programming is object-oriented, which means that information is oriented around the objects that the programming manipulates. Objects in knowledge base 50 may "behave" and thereby cause data and relationships between objects in the knowledge base to change. To effect such behavior, the programming makes use of demons, which are programs invoked when certain data elements in frames are accessed and determines what to do when certain conditions arise. The programming within knowledge base 50 permits objects to be represented and their interrelationships to be manipulated in a manner analogous to cells of a numeric spreadsheet. This feature is explained in more detail below, in connection with effects processor 62.

Decision processor system 60 includes two subsystems, including an effects processor 62 and a strategy processor 66, each associated with special programming to accomplish the functions described below. The hardware associated with each processor may be any one of a number of well-known devices capable of executing computer instructions, such as a microprocessor.

Effects processor 62 embodies the concept of a "symbolic spreadsheet". The symbolic spreadsheet is analogous to numeric spreadsheets in common use today, in which numbers or formulas are assigned to cells. The user can change a value in one cell and immediately see the effect on values of other cells. In contrast to numeric spreadsheets, effects processor 62 uses frames as cells to symbolically represent components of a particular domain. Values, complex entities, or even programs may be assigned to cells. The frames are linked by means of descriptions of their relationships. When a change in the domain occurs or when a hypothetical event is proposed by a user, the programming determines the effect of those changes on other aspects of the operation. A term used to refer to this type of programming is "constraint propagation."

For the airline flight operations example, cells represent objects, such as airplanes, crews, and airports, and events that affect them, such as a flight delays, airport closings, or maintenance delays. When the system receives an event, effects processor 62 determines its effects and updates knowledge base 50.

A feature of effects processor 62 is that it is programmed to permit the user to create and examine scenarios, i.e., sets of hypothetical changes. A scenario is generated by knowledge base 50, such that the real world is replaced by a scenario, while maintaining the real knowledge base data of the base. Thus, effects processor 62 operates either in response to input from knowledge base 50 or from input from user created scenarios.

A second subsystem of decision processing system 60 is the strategy processor 66. The programming of strategy processor 66 permits several basic functions: solution of "best choice" problems using a particular method, variation of methods, and variation of strategies. Strategy processor 66 may operate with or without effects processor 62. In other words, neither the programming nor the hardware associated with strategy processor 66 is dependent on effects processor 62. If station 20 has no effects processor 62, communication among the system components, such as knowledge base 50 and user interface 40, may be directly with strategy processor 66 by means of bus 17 or other communication means. Furthermore, strategy processor 66 may be programmed in a manner that is independent of other representations or applications and requires no other files. This feature is described below in connection with FIG. 2. The functions performed by strategy processor 66 are described below in connection with FIGS. 3-6.

Strategy processor 66 and effects processor 62 are in communication with both user interface 40 and with each other. They may thereby interact with the user and with each other, to permit the user to determine effects of events depending on a particular choice. This interrelationship is discussed in further detail in connection with FIG. 7.

Figure 2:
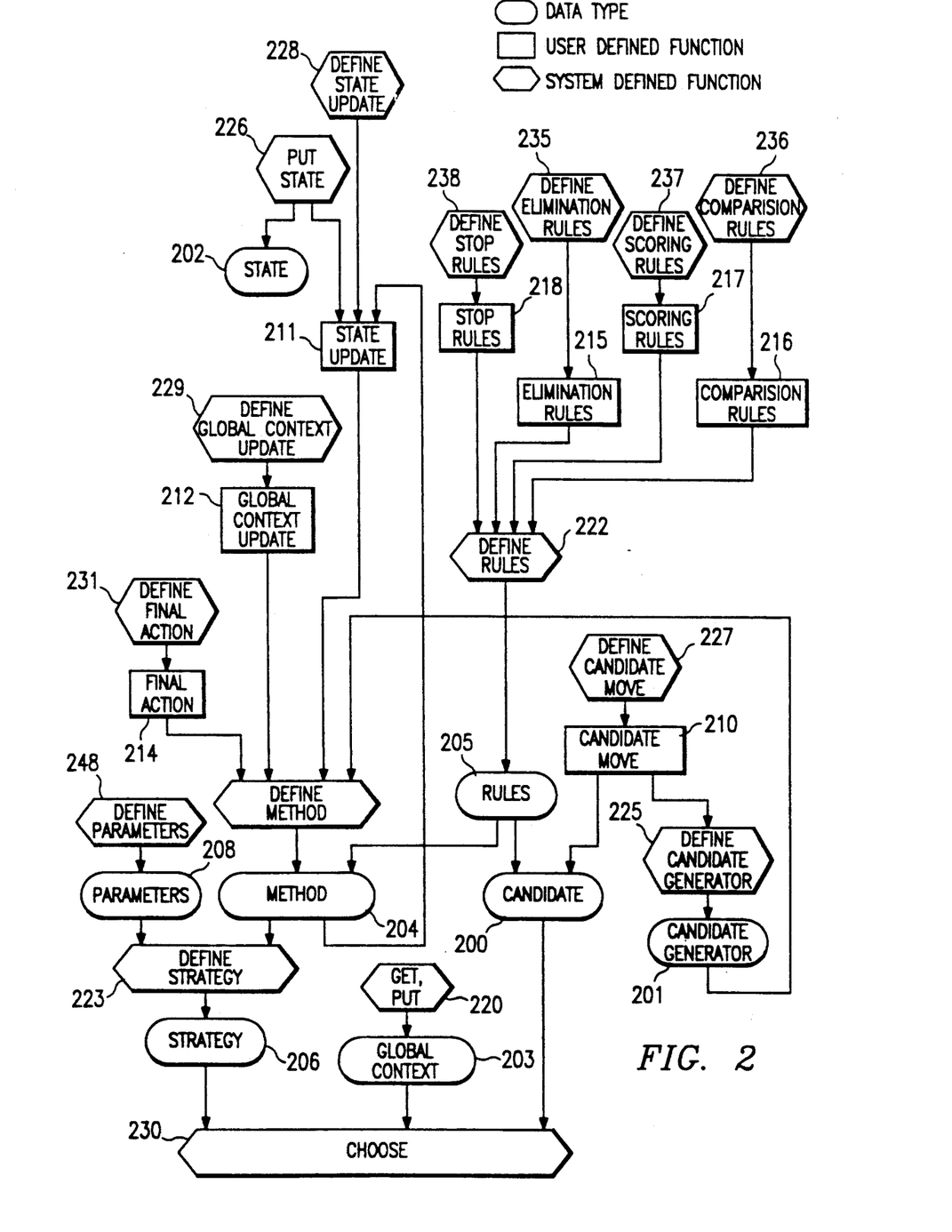
FIG. 2 illustrates a method for creating a program architecture for programming a computer in accordance with the present invention.

Referring now to FIG. 2, another aspect of this invention is the method by which a computer may be programmed to carry out the functions of strategy processor 66. In the preferred embodiment, the programming is expressed in LISP, a well-known computer language amenable to symbolic processing. The features of LISP are described in a number of commercially available publications, with a distinctive feature being the use of lists as a data structure. Yet, the invention could be implemented with other programming languages, with the primary characteristics of the programming being that it be capable of expressing what to do with the data and rules described below, such that the same functional results are achieved. The terms "functions" and "data types" are associated with LISP, and other programming languages may use different terms for similar programming structures.

As indicated in FIG. 2, the programming of the invention is directed to functions and data types that will represent a decision making process at a number of levels. At one level, the decision may be the result of a method selected from alternatives provided by the functions and data types. At another level, a set of methods may comprise a strategy for making particular choices. Yet, a feature of the invention is that the selections permitted at each level, i.e, choice methods and strategies may be interactive or programmatic. In other words, the user can make the selections of methods and strategies, or the selections can be the result of programming. In the latter case, the inherent learning and heuristic capabilities of artificial intelligence can be used. Thus, the "user" could be either a person operating the equipment or a program that exchanges information with another.

Furthermore, not all of the data types and functions described below are essential to operation of the invention in its simplest form, and with simple modifications, the invention may accomplish the function of assisting a user in making decisions with some, and not necessarily all of the data types and functions described herein. For example, the decision making function can be used without any selecting methods. It is not necessary to the invention that there be more than one method of decision making or that there be more than one strategy. The strategy programming can be used for managing a set of values only, with no associated choice methods. Thus, in the programming of FIG. 2, the data types and functions associated with defining multiple methods and multiple strategies, are not essential to the invention and the programming is easily modified to operate without them.

As indicated in FIG. 2, in general, the programming steps are defining functions and creating data types. An additional step is organizing these data types and functions into a programming structure to control the application of the functions and access to data. FIG. 2 is directed to the architectural features of the invention, with functional features and their implementation being further explained in connection with FIGS. 3-7.

Candidate 200 is a data type that represents the candidates involved in a selection process. Candidate 200 is associated with functions from Candidate Move 210, and a data type, Rules 205. Candidate 200 is created and maintained by Candidate Generator 201.

Candidate Generator 201 is a data type that specifies how the candidate pool is created, maintained, and accessed. Its internal structure is a list of the generator name, data, and functions from Candidate Move 210. The data in Candidate Generator 201 may range from a current candidate pool to a set of functions for determining candidates. Candidate Generator 201 uses functions defined as Candidate Move 210 to create and update the candidate pool and to produce each subsequent candidate on demand. Candidate Generator 201 permits more than one type of candidate generation, thus each Candidate Generator is identified with a name. Candidate Generator is an element of Method 204. Choose 230 determines whether more than one generator will be used during a decision making process, as specified by the current method.

Candidate Move 210, is a set of related user defined functions, which provides an initial pool of candidates or some user defined data structure representing the information required to produce each subsequent candidate on demand. Candidate Move also provides the means to extract a single candidate from the candidate pool and a method for reducing the candidate pool after a single candidate has been extracted. Candidate Move 210 is created by Define Candidate Move 227, a system function, and is accessed by Define Candidate Generator 225, a system function.

State 202, a data type, stores runtime information about a candidate, i.e., its "state" information, both system and user generated. The system created information includes the number assigned to the candidate relative to the current candidate pool and the name of the generator that produced the candidate. State is updated by a system function, Put State 226, and is accessible as a parameter from within Rules 205 or Final Action 214.

State Update 211 is a user defined function, that updates a candidate's state information, using a system function Put State 226. State Update 221 is created by the system function Define State Update 228, and is accessed as an element of Method 204.

The preferred embodiment of the invention includes a data type, Global Context 203, which represents information bearing on the best candidate that is not a property of individual candidates. It is a list of datum keyword and value pairs, initialized by an argument to Choose 230. It is accessed by a Get system function and updated with a Put system function.

Global Context Update 212 is a user defined function that makes changes and additions to the global list, using the Get and Put system function 220 referred to in the preceding paragraph. It is created by Define 231, a system defined function, and is accessed as an element of choice method in Method 204.

Method 204, a data type, represents information from which a method for making a choice in a particular way is selected. The internal structure of Method 204 is comprised of a number of slots, including at least one of each of the following: a choice name, a method name, a global update function, a candidate generator, a state update function, rules, final action function, rule weights, soft violation inclusion option, scaling option, and approach. The information in these the slots is associated with the data types and functions described herein. Rule weights, soft violation inclusion, and the scaling option are discussed below in connection with FIGS. 3-5. Method 204 permits choices to be made using one of a multiplicity of possible methods.

Rules 205 is a data type comprised of at least one set of rules. In the preferred embodiment there are a number of types of rules, including elimination rules, comparison rules, scoring rules, and stop rules. Rules are represented by functions, which are created and maintained by a Define system function 222. Thus, the rules within Rules 205 may include functional programming. Basic characteristics of each type of rule are described immediately below, with functional characteristics described in connection with FIGS. 3-7. Rules are an element of Method 204 and return certain values, as explained below.

Elimination Rules 215 is a function that determines whether a candidate can be eliminated from the selection process based upon some aspect of that candidate. Elimination Rules 215 accepts a candidate and that candidate's current state information list as arguments and returns a non-nil value if the candidate is to be eliminated from consideration; otherwise it returns a nil value. The rules in Elimination Rules may include both "soft" and "hard" elimination rules, which are used differently in Choose 230. Hard elimination rules represent insurmountable constraints. Soft elimination rules represent constraints that are not absolute and may be balanced against other considerations.

Comparison Rules 216 is a function that determines which of two candidates is "better" or if they are "equal". The rules in Comparison Rule 216 express opinion or preference, which may be conflicting. Comparison Rules 216 accepts two candidates and the corresponding current state information list for each candidate as arguments. The return value of Comparison Rules 216 is a keyword, which depends on whether the rule determines that the first candidate is better, that the second candidate is better, that it cannot make a determination which is better, or that it does not apply. Comparison Rules 216 may also return a tentative result, and optionally, the numeric strength of the tentative result.

Scoring Rules 217 is a function that gives a candidate a numeric weight for comparison with other candidates, based upon some characteristic of that candidate. Scoring Rules 217 is used in one of the approaches of Choose 230, as explained below. Scoring Rules 217 accepts a candidate and the corresponding current state information list for that candidate as arguments and returns a number to be used as the rank weight for the candidate.

Stop Rules 218 is a function that determines if Choose 230 may be halted prematurely. Stop Rules 218 accepts as an argument a keyword describing the current situation, i.e., whether the current candidate is the new best candidate or whether the Candidate Generator has stopped producing candidates. Depending on the current situation, Stop Rules 218 also accepts as a keyword either the current candidate or the current best candidate if the generator has stopped producing candidates, and the state information list of the aforementioned candidate. Stop Rules 218 returns whether or not to stop the decision making process.

Although not shown in FIG. 2, another feature of the programming method of the invention is Learn, a system function for automatically adjusting rule weights. The characteristics of Learn are explained in connection with FIG. 6.

Choose 230 is a system function that picks the best candidate. Its arguments include: a method, unless the method is determined by a strategy, a candidate pool, and global context information. Choose 230 includes a number of algorithms that embody different choice approaches, which are specified in Method 204. Two such approaches, a hierarchical method and a weighted choose approach, are explained in connection with FIGS. 4A and 4B.

Final Action 214 is a user defined function that enhances the decision making process by doing something with a candidate chosen as best. Its inputs are the best candidate and the state information list of that candidate. The returned value is a value returned from a call to Choose 230. Final Action 214 is created by a Define system function 231 and is an element of Methods 204. There may be more than one action in Final Action 214, and final actions may be applied in sequence.

Strategy 206 is a data type that names a given situation in which various choices are to be made and designates the strategy parameters and choice methods pertinent to the situation. For a given choice making situation, Strategy 206 designates which method is to be used to make a best choice. Its internal structure includes a parameter name/value pair list and a choice/method pair list. Strategy is created by Define Strategy 223, a system function, which is accessed by a number of other system functions.

Strategy Parameters 208 is a user defined data type, accessed by Rules 205, such that rules behave differently depending on strategy parameter values. Strategy Parameters 208 is created by Define Strategy Parameters 248, a system function. The values within Strategy Parameters can be obtained interactively from a user or from another program. The strategy feature is further discussed in connection with FIG. 5.

Figure 3:
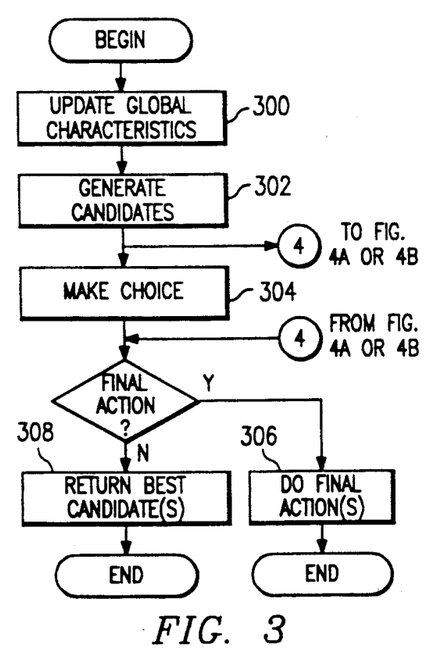
FIG. 3 is a flowchart illustrating a method of computer-aided decision making in accordance with the present invention.
Figure 4A:
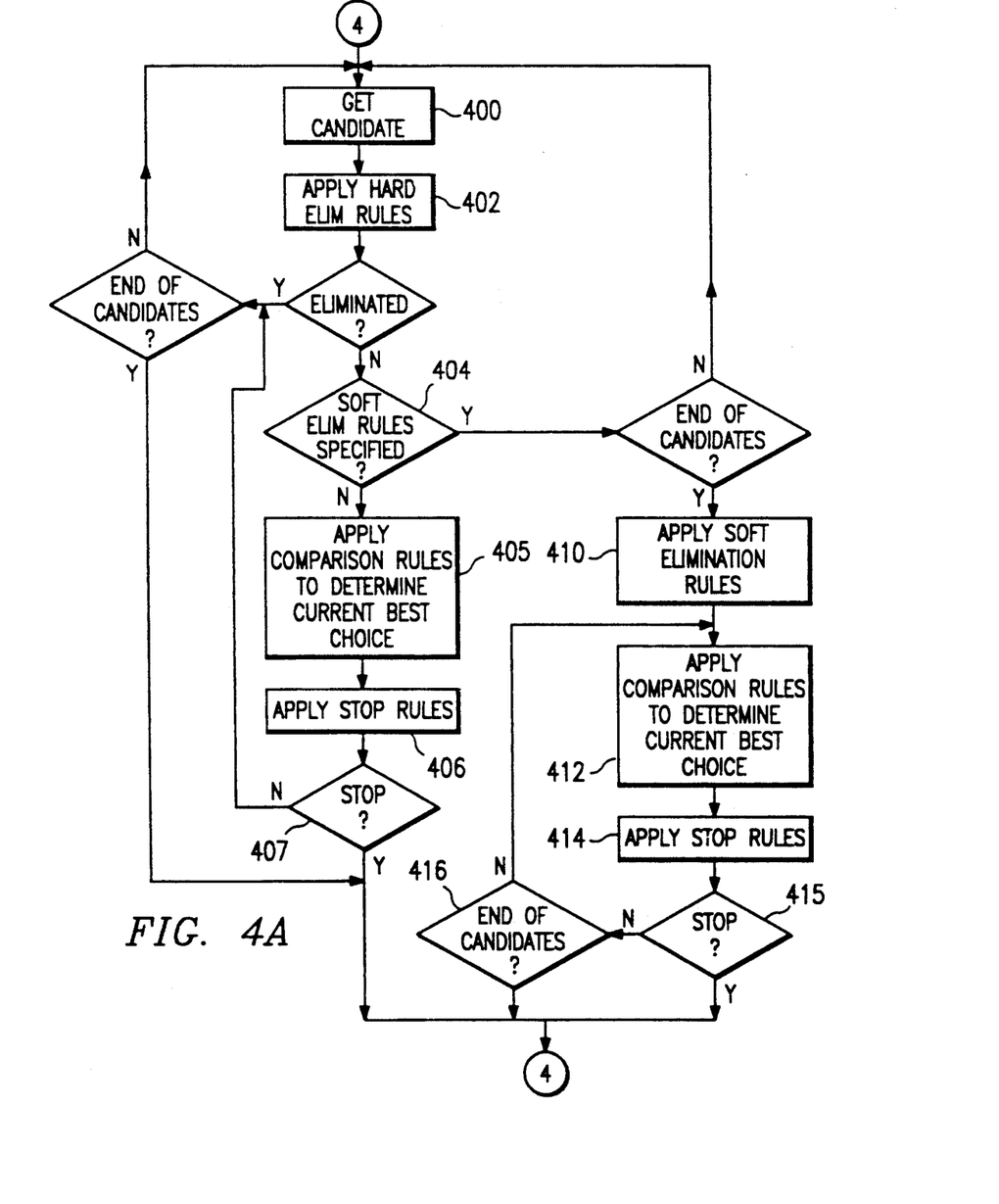
FIGS. 4A and 4B are flowcharts illustrating steps that are further detail of the evaluation step of FIG. 3.
Figure 4B:
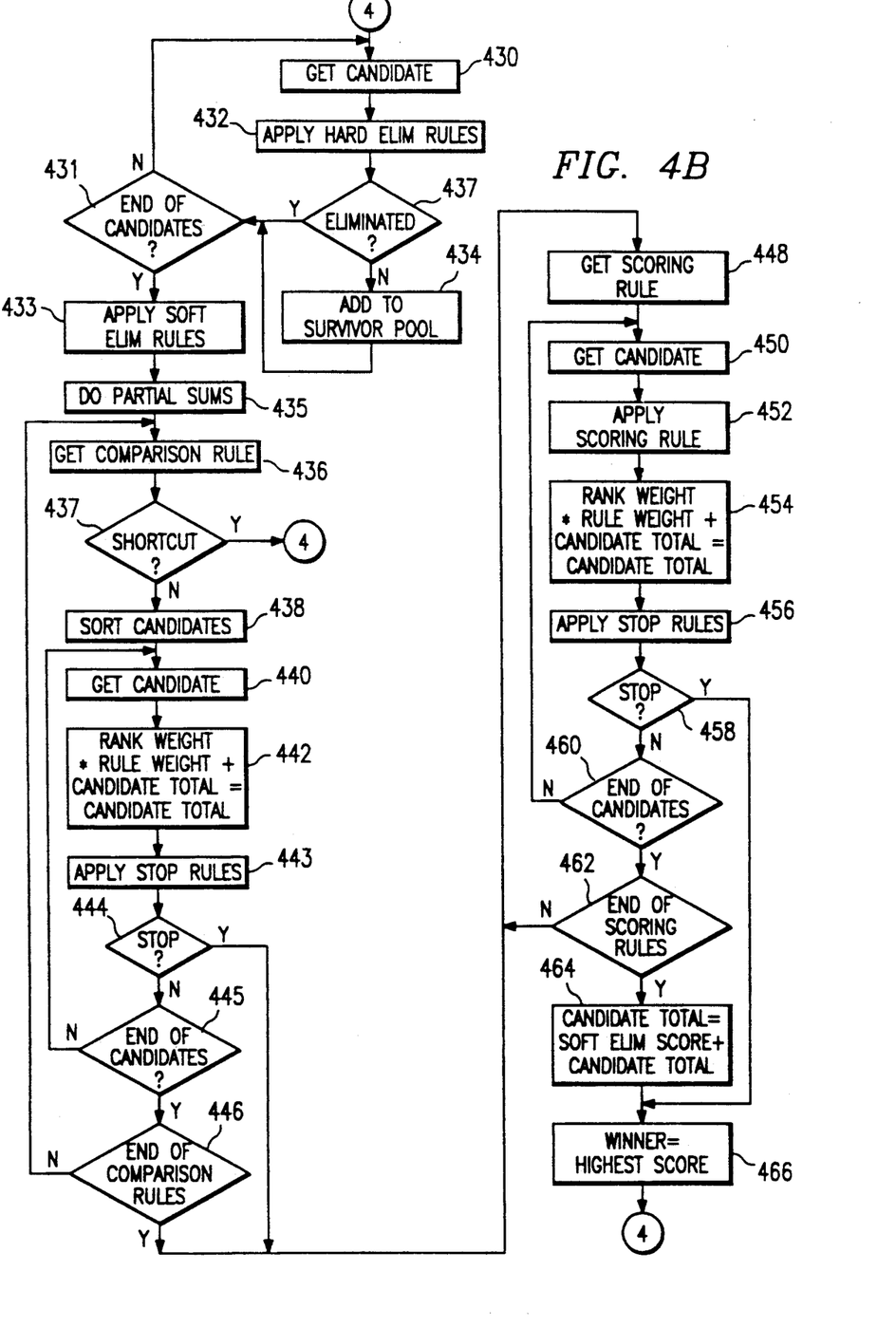
Figure 5:
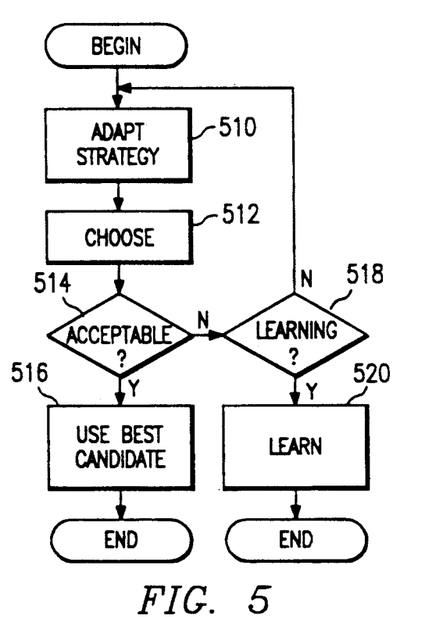
FIG. 5 is a flowchart illustrating a method of computer-aided decision making, using a strategy generated by said computer.
Figure 6:
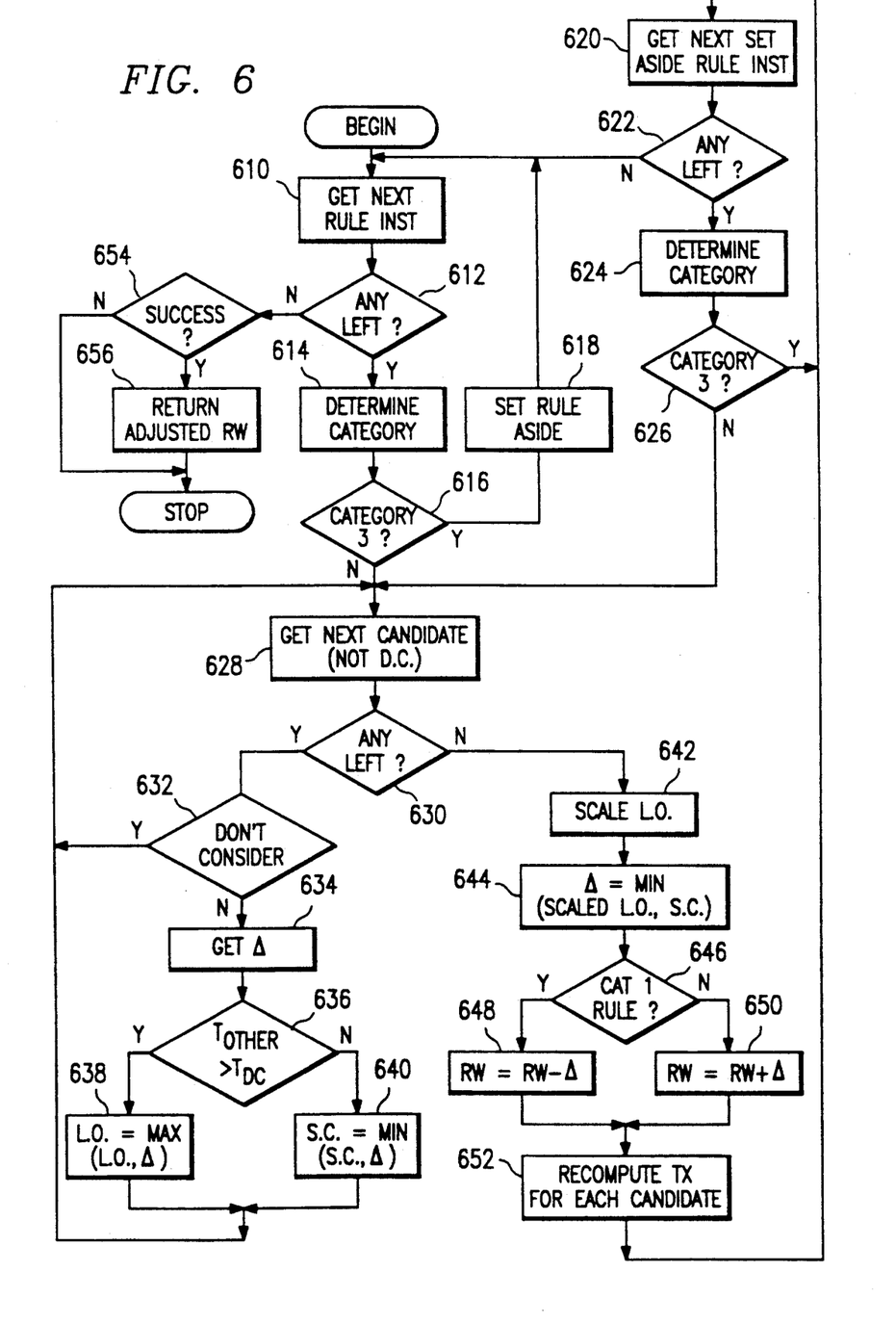
FIG. 6 is a flowchart illustrating a learning routine used with the method of FIG. 4B.
Figure 7:
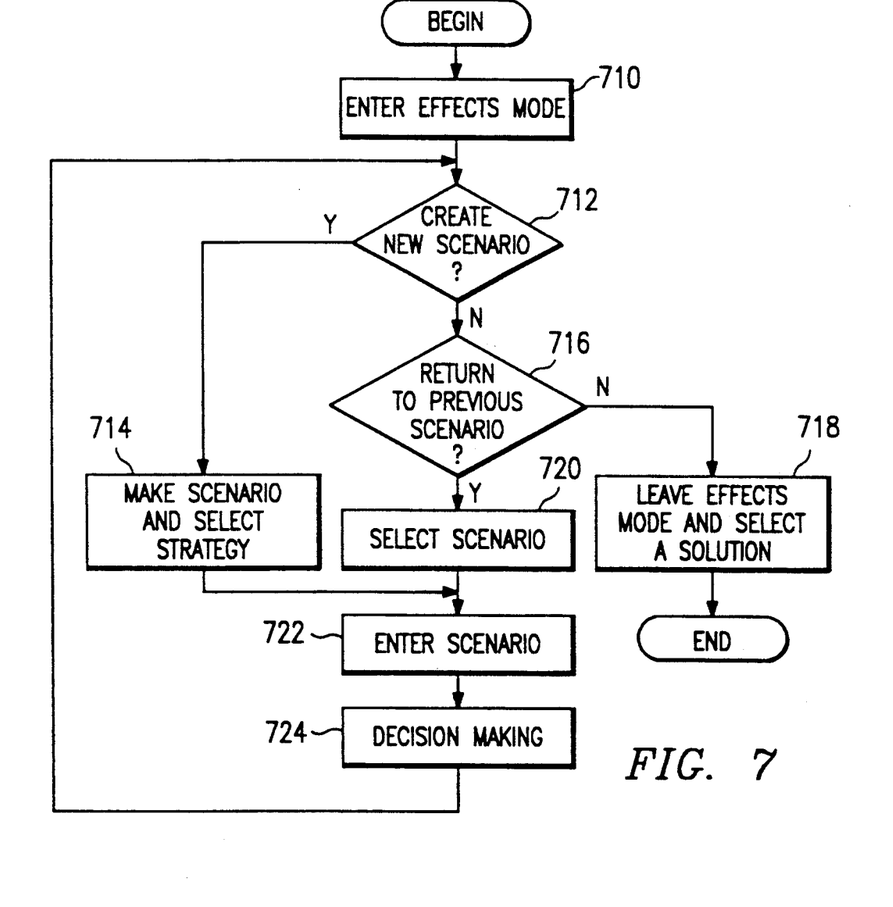
FIG. 7 is a flowchart illustrating a method of computer-aided decision making, using a scenario generated by said computer.

FIGS. 3-7 illustrate another aspect of the invention, which is a method for using a computer to assist a user in selecting a best choice among alternative choices when making a decision. Essentially, FIGS. 3, 4A, and 4B illustrate the method of making a best choice, given a particular choice method. FIGS. 5 and 6 illustrate the a method of the invention using strategy selection and learning features. FIG. 7 illustrates a method of the invention using a scenario feature. These methods can be implemented with the functions and data types discussed in connection with FIG. 2. As indicated above, the "begin" stage of each method can be initiated by a user and the method can be executed interactively, or the method can be programmatic and called or used or both by other programming.

The method of FIG. 3 assumes that there exists a pool of candidates. Step 300 is updating the characteristics of these candidates. A programming structure for implementing Step 300 is the Global Context Update 212. Step 302 is executing a candidate generation procedure of the computer, such that candidates may be evaluated singularly or in multiples for comparison purposes, during the other steps of the method. Candidate generation can range from a simple process that provides the initial pool of candidates as a simple list and extracts elements from the list one at a time, to a more complex process in which candidates are generated on demand using a data structure that represents the candidate pool. The generation of each candidate may be a computationally iterative process, so only as many candidates as required are generated. This latter process can be implemented with the aid of stop rules. However, for some choose options, the entire list of candidates must be generated to do a complete sort of preferred choices or perform the full weighted choose explained below. Although not indicated in FIG. 3, Step 302 may be repeated, i.e, there may be more than one candidate generation. Programming for implementing Step 302 is described in connection with FIG. 2, in particular, Candidate Generator 201, Candidate Move 210, and Choose 230. Whether or not there will be more than one candidate generation is determined by Choose 230.

Step 304 is executing a procedure for selecting a best candidate for resolving the decision. Within Step 304 are alternative approaches, which are described below in connection with FIGS. 4A and 4B. An example of programming for implementing Step 304 is the function Choose 230.

Step 305 is determining whether there are any final action functions, such as Final Action 214. If there are, Step 306 is performing the final action. If there are no final actions, Step 308 returns the best candidate to the user.

FIGS. 4A and 4B illustrate substeps of Step 304. As will be explained in connection with each figure, the invention provides two choice approaches: a hierarchical approach and a weighted choose approach. Regardless of the approach, it is assumed that a pool of candidates with updated information is available from the data types and functions described above. Furthermore, if rules are to have rule weights, the rules are sorted accordingly.

Both approaches include steps involving the application of hard and soft elimination rules. If a hard elimination rule fails for a candidate, the candidate is eliminated and the next candidate is considered. Soft elimination rules are applied to each candidate that has passed the hard elimination rules. Unlike hard elimination rules, soft elimination rules may continue to be applied to a candidate, regardless of whether a failure has already occurred. A soft elimination rule score is accumulated for each candidate by adding in the rule weight of each rule passed. In addition to receiving scores, the candidates are assigned to one of two groups: a group containing candidates that have passed all soft elimination rules applied so far, and a group containing candidates that have failed at least one soft elimination rule. Programming to implement the rules is described above in connection with Rules 205, Method 204, and Choose 230.

The particular approach for decision making may include scaling with respect to soft elimination rules. If scaling is to be applied, the final soft elimination score in multiplied by the number of candidates currently being considered. This allows the soft elimination score to be combined on an equal basis with the subsequent comparison rule score. An example of implementation of such scaling is an element, such as a flag, in Method 204.

Both approaches include steps for applying stop rules. If a stop rule succeeds for a candidate, the decision making process stops. One example of a stop rule is when the latest best candidate is sufficient. Another example is when the decision making has taken too much time. This is implemented by saving the starting time in a programming structure, such as Global Context Update 212, and checking the current time with the stop rule. A third example of a stop rule is when a maximum number of candidates is reached. This can be implemented by storing the number of candidates in a data structure, such as in State 202. A fourth stop rule is when the decision making process has reached the end of a candidate generator with at least one viable candidate or when the current best candidate is good enough. This rule can be implemented by checking Candidate Generator 201.

Both approaches may also include steps for applying comparison rules. Comparison rules compare two candidates to determine which is better, i.e, a pairwise comparison. A candidate is better if the current rule returns a definitive result to that effect. If the rule returns "equal", or the rule returns a tentative result, then the next rule in sequence is considered. A tentative result may be either general or include a degree of certainty. Tentative results are remembered because if all comparison rules are exhausted without a definitive result being obtained, the tentative result having the highest certainty or deriving from the highest priority rule is used. The highest priority rule is the rule returning the highest certainty or ordered first in user-specified ordering. Programming structures for implementing this step are described in connection with Rules 205 and Method 204.

FIG. 4A illustrates a hierarchical approach to choosing a best candidate. Step 400 is getting a candidate. Step 402 is applying hard elimination rules. Step 403 is determining whether the candidate was eliminated by the hard elimination rules. If the candidate was eliminated in Step 402, Step 400 is repeated to get another candidate, unless the candidate pool is exhausted. If the candidate was not eliminated in Step 402, Step 404 is determining whether soft elimination rules are specified. An example of implementing Step 402 is the data type Method 204. If no soft elimination rules are specified, Step 405 is applying comparison rules to the candidates not eliminated in Steps 402 and 403. To apply comparison rules, each candidate is compared against the current best candidate using one comparison rule at a time. This process continues until one of the two candidates is deemed better. The winner becomes the current best candidate. The comparison rules are ordered by the user in some meaningful way. After Step 405, Step 406 applies stop rules, and Step 407 is determining whether a stop rule prematurely ends the selection process.

Returning to Step 404, if soft elimination rules are specified, Step 410 is applying them to the candidates that are not eliminated in steps 402 and 403, using the soft comparison rules as explained above. Step 412 is applying comparison rules to the remaining candidate pool to pick the best candidate. Step 414 is applying stop rules and if there are stop rules, Step 415 terminates the selection method. If there are no stop rules, Step 416 determines whether there are remaining candidates to be evaluated, and if so, Step 412 is repeated. If Step 416 determines that there are no more candidates, the method is terminated.

FIG. 4B shows a weighted choose approach to making a choice in accordance with Step 304 of FIG. 3. Step 430 is getting a candidate. Step 432 is applying hard elimination rules, and Step 439 is determining whether the candidate is eliminated. If the candidate is thereby eliminated, Steps 430 and 432 are repeated and the method gets another candidate, unless Step 431 determines that there are no more candidates. If the candidate is not eliminated, Step 434 is adding the candidate to the candidate pool of surviving candidates. These steps continue for each candidate.

Step 433 is applying soft elimination rules and determining a soft elimination score for each candidate. A feature of the invention is that the treatment of violators of soft elimination during the application of comparison rules may be different, depending upon the particular method being used. One alternative is to include all violators in the comparison rule steps. A second alternative is to include all violators only if no candidates pass all soft constraints. A third alternative is to include those candidates violating only the previous soft rule if no candidates pass all rules, and either move to the following soft elimination rule or move immediately to the comparison rule stage. Other alternatives may be as varied as desired and implemented by appropriate programming. The programming structure of Method 204 permits implementation of this step.

Step 435 is determining a partial sums score for every comparison rule, which has the form:

$$PS(i) = \text{Sum} (j=i \text{ to } n) \text{ MaxGain}(j),$$

where i corresponds to the comparison rule in question and n is the number of comparison rules. MaxGain is the most that a second place candidate can gain on a first place candidate in total score, $$\text{MaxGain}(i) = (n-1) * \text{rule weight},$$

where i corresponds to the comparison rule in question.

Step 437 is determining whether the comparison rule steps of FIG. 4B can be short circuited after the application of a comparison rule to the complete candidate pool. This short circuit occurs if the remaining comparison rules cannot cause any other candidate to have a higher total score. The premise of the short circuit is that a comparison rule can affect the total scores of candidates in either of the following ways: (1) the current first place candidate's score will increase by at least 1 * rule weight, and (2) the current second place candidate's score will increase by at most n * rule weight, where n is the number of candidates. Step 437 determines the difference between the current highest total score and the current second highest total score. If this difference is greater than the partial sum entry from the partial summation list corresponding to the comparison rule about to be applied, the comparison rule iteration is terminated. Step 437 is not executed if there are scoring rules.

If there is no short circuit, Steps 436–444 form an iterative loop for applying comparison rules. More specifically, Step 436 is getting a comparison rule, and Step 438 is sorting the candidates using the comparison rule as a pairwise sort predicate. Step 440 is getting candidates from the sorted list. Step 442 is determining a candidate total as a product of its rank weight times the rule weight plus the old candidate total. To determine rank weights, Step 442 gives the first candidate in the sorted list a rank weight equal to n, the number of candidates in the current pool. Step 442 gives the second candidate a rank weight equal to $n-1$, unless Step 438 determined that candidate to be equal to the first candidate, in which case it receives the same rank weight. This ranking continues for each candidate. After Step 442, Step 443 is applying stop rules, and Step 444 stops the comparison rule phase if a stop rule applies. Steps 445 and 446 ensure that Steps 436–444 are repeated for each candidate and each rule.

Steps 448–458 are an iterative loop for applying scoring rules. Step 448 is getting a scoring rule and step 450 is getting a candidate from the current pool. Step 452 is applying the scoring rule from Step 450 to each candidate individually. Step 454 determines a new candidate total as the product of the rank weight of the candidate returned by the scoring rule times the rule weight of the scoring rule. This product is added to the candidate total from Step 442 or from the previous scoring rule iteration.

After Step 454, Step 456 applies stop rules, and Step 458 stops the comparison rule phase if a stop rule applies. Steps 460 and 462 ensure that Steps 448–458 are repeated for each candidate and each rule.

Step 464 determines the final candidate total as the sum of the soft elimination score from Step 435 and the candidate total from Step 464. If desired, the soft elimination score may be scaled in the manner explained above. Step 466 is determining the best choice as the candidate having the highest score as a result of the steps of FIG. 4B.

Referring again to FIG. 3, after a best choice has been determined with the choice approach of either FIG. 4A or 4B, Step 306 is carrying out any final action that may be specified. If there is no final action, Step 308 is returning a best candidate, or alternatively a ranked set of recommended candidates.

An important feature of the invention is that the steps of FIG. 3 may be carried out with or without the prior selection of a strategy. This feature of the invention is best illustrated by FIG. 5. As discussed in connection with Strategy 206 in FIG. 2, the programming of the invention permits multiple strategies to be defined. A strategy has a name and consists of a set of values for strategy parameters, and a set of methods for making particular choices. Programming for implementing selection methods has already been described in connection with FIG. 2, especially in connection with Method 204.

As shown in FIG. 5, using the invention with the strategy selection features involves a first step, Step 510, of adopting a strategy. When a strategy is adopted, the parameter values and choice methods of that strategy become the current values and choice methods. Step 512 is executing the decision making steps of FIG. 3 to choose a best candidate. Step 514 determines if the best candidate is acceptable. If it is, Step 516 is using the best candidate in other programming or as desired by the user.

Steps 518 and 520 of FIG. 5 illustrate another feature of the invention, which may be used during the development stage of the decision making system. This is a learning feature, which is invoked by the user after a decision making operation has failed to produce the desired result. In general, the learning feature is a rule weight adjusting feature in connection with the weighted choose method, so that the candidate who is the user's best choice will receive the highest score, and thereby improve the knowledge base. The learning steps are iterative for each "rule instance", i.e., each part of the weighted choose method in which a particular rule was evaluated for the entire set of candidates surviving elimination. A rule instance is the rule weight and a list of candidate/rank weight pairs.

Step 518 determines whether this learning feature is to be invoked. If so, Step 520 is performing it. The substeps of Step 520 are illustrated in FIG. 6. It is assumed that the programming has already saved each candidate and its state information, including the total score for each candidate, and each rule instance. Step 610 is getting a rule instance. Step 612 ensures that the learning steps continue for each rule instance.

Step 614 is determining the relationship between the current rule and the current candidate's total, T. For each rule, there are three status categories: (1) every candidate that has a higher current T than the desired candidate is ranked higher by the current rule, or (2) every candidate that has a higher current T than the desired candidate is ranked lower by the current rule, or (3) neither category (1) nor (2) exists. According to the category in which a rule falls, the remaining steps increase or decrease that rule's weight or set the rule aside.

If the rule falls within category 3, Step 618 sets the rule aside. Steps 620–626 ensures that if the rule is set aside, after any rule that falls within category (1) or (2) has had its weight adjusted, the set aside rules can be looked at again to determine if any one of them now fall within category (1) or (2).

If the rule does not fall in category 3, Step 628 is getting the next candidate, with the goal of looping through all candidates except the desired candidate. Step 630 is determining if there are candidates remaining to be considered. If there are candidates, Step 632 is determining whether that candidate should be considered. This will be the case if the T for the current candidate if less than the T for the desired candidate, and (1) for a category 1 rule, the ranked position of the current candidate with respect to the rule is higher than that of the desired candidate, or (2) for a category 2 rule, the ranked position of the current candidate is lower than that of the desired candidate. If the candidate is not to be considered, Step 628 is repeated.

If the candidate is to be considered, Step 634 is determining delta as follows:

$$\text{delta} = |(T_{other} - T_{desired})/(r_{desired} - r_{other})|,$$

where $T_{other}$ and $r_{other}$ are the current total score and rule number associated with that candidate, and $T_{desired}$ and $r_{desired}$ are the total score and rule number associated with the desired candidate.

Step 636 is comparing T-other to T-desired. If T-other is greater than T-desired, Step 638 is determining a largest overtake value, LO, such that LO is the maximum of the current LO and delta. If T-other is not greater than T-desired, Step 640 is determining a smallest catch up value, SC, such that SC is the minimum of the current SC and delta. After either Step 638 or Step 640, Step 628 is repeated and an LO or SC is computed for the next candidate.

Referring back to Step 628, if there are no more candidates left to consider, Step 642 is scaling the LO. This scaling is accomplished by adding the number of rules remaining in the rule instance pool to the number of rules remaining in the set aside pool and dividing that sum into the largest delta. Step 644 is recomputing delta as the minimum of the scaled LO and SC. Step 646 is determining whether the rule is a category 1 rule. If so, Step 648 is computing a new rule weight as the old rule weight minus delta. If the rule is not in category 1, which implies that it is in category 2, the rule weight is the old rule weight plus delta. Step 652 recalculates T for each candidate, and checks the pool of set aside rules, as indicated above.

After every rule instance has been evaluated by Steps 614–652, Step 654 is determining whether the desired candidate has an improved position in a sorted list of candidate totals than it did with the original rule weights. If so, Step 656 returns the adjusted rule weights.

Referring again to FIG. 5, if the learning feature is not invoked, step 510–514 are repeated until an acceptable candidate is determined.

FIG. 7 illustrates a feature of the invention that integrates features of the decision processing system of FIG. 1. In particular, FIG. 7 illustrates a method for generating trial solutions using different strategies. The method may be implemented using the apparatus and programming discussed above in connection with decision processor 60 and knowledge base 50.

Step 710 is entering an "effects mode" of a computer system programmed with constraint propagation capabilities. Step 712 is determining whether a new scenario is to be created. If a new scenario is to be created, Step 714 is creating the scenario and associating a particular strategy with the scenario. If no new scenario is to be created, Step 716 is determining whether a previously selected scenario is to be processed. If not, Step 718 is leaving the effects mode and selecting a solution. Referring again to Step 716, if a previous scenario is to be used, Step 720 is selecting a scenario. Once a scenario has been created or selected, Step 722 is entering that scenario, which implies the adoption of an accompanying strategy. Step 724 is solving the problem by entering the decision making aspects of the invention. The programming discussed above in connection with FIGS. 3, 4A, and 4B are directed to this step.

Although the invention has been described with reference to specific embodiments, this description is not meant to be construed in a limiting sense. Various modifications of the disclosed embodiment, as well as alternative embodiments, of the invention will become apparent to persons skilled in the art upon reference to the description of the invention. It is, therefore, contemplated that the appended claims will cover such modifications that fall within the true scope of the invention.

What is claimed is:

1. In a computer system having a stored system of rules and a knowledge base of facts, events, and programming, an improved method for using said computer to display a problem scenario and modify the scenario according to a best choice among alternative choices in a particular solution domain, comprising the steps of:

representing a real world problem to be solved as at least one data object;

generating a problem scenario from a number of data objects, wherein said objects are arranged as a symbolic spreadsheet in which cells of said spreadsheet are frames representing said objects and their attributes and wherein said cells are linked by relationship attributes of said objects;

displaying said problem scenario to a user;

generating a pool of candidate solutions to said problem scenario;

determining a candidate selection strategy for evaluating said candidates, wherein said strategy defines a method for applying rules;

evaluating said candidates, using said candidate selection strategy to access and apply a combination of hard elimination rules, soft elimination rules, and comparison rules from a stored system of rules, to each of said candidate solutions until a best candidate is selected;

assigning a solution value representing said best candidate to variables of said problem scenario;

modifying said scenario to substitute said solution value, such that a new scenario reflecting the effects of said solution value is generated, wherein all objects having attributes affected by said solution value are modified; and displaying said modified scenario to a user.

2. The method of claim 1, wherein said candidate generating step further comprises updating the characteristics of said candidates in accordance with predetermined data or user input.

3. The method of claim 1, wherein said strategy is selected in accordance with user input.

4. The method of claim 1, wherein said evaluating step comprises evaluating said candidates using a hierarchial method.

5. The method of claim 1, wherein said evaluating step comprises evaluating said candidates using a rule weighting method.

6. The method of claim 5, wherein said rule weighting method includes a step for short circuiting said evaluation step by determining that a current best candidate cannot be surpassed.

7. The method of claim 29, wherein said rule weighting method learns best candidate selection by adjusting said rules.

8. The method of claim 1, wherein said candidate evaluating step further comprises using soft elimination rules.

9. The method of claim 1, wherein said candidate evaluating step further comprises using comparison rules.

10. The method of claim 1, wherein said candidate evaluating step further comprises using scoring rules.

11. The method of claim 1, wherein said candidate evaluating step further comprises using stop rules.

12. The method of claim 1, and further comprising the step of using said best choice in a final action.

13. The method of claim 1, wherein said candidate generating step further comprises updating the characteristics of said alternative choices in accordance with predetermined data or user input.

14. The method of claim 1, wherein said computer provides more than one method of applying said rules during said step of evaluating.

* * * * *